(No Model.) 5 Sheets—Sheet 1.

O. B. PECK.
CENTRIFUGAL ORE SEPARATOR.

No. 479,456. Patented July 26, 1892.

Witnesses:
Inventor:
Orrin B. Peck

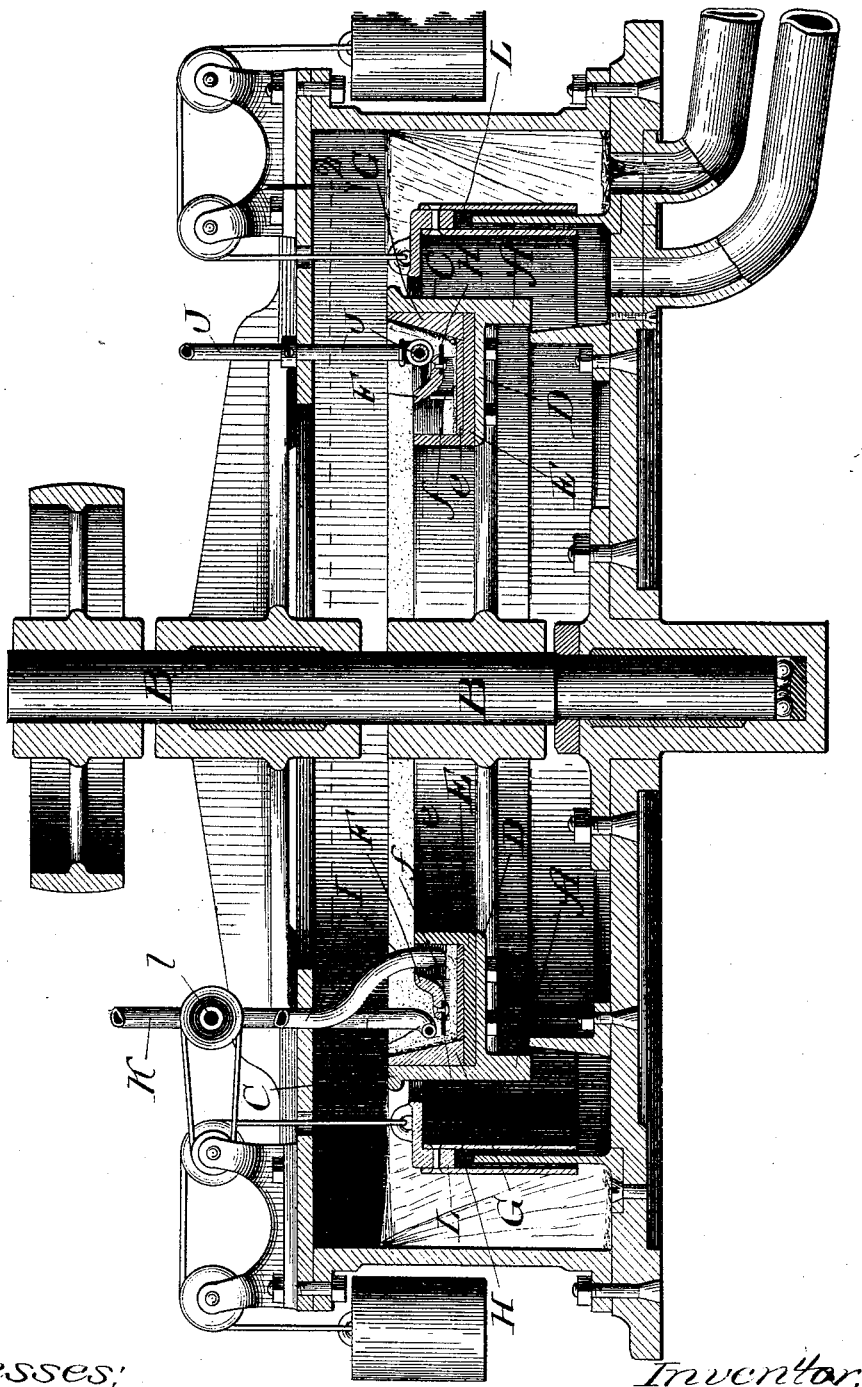

(No Model.) 5 Sheets—Sheet 3.
O. B. PECK.
CENTRIFUGAL ORE SEPARATOR.
No. 479,456. Patented July 26, 1892.
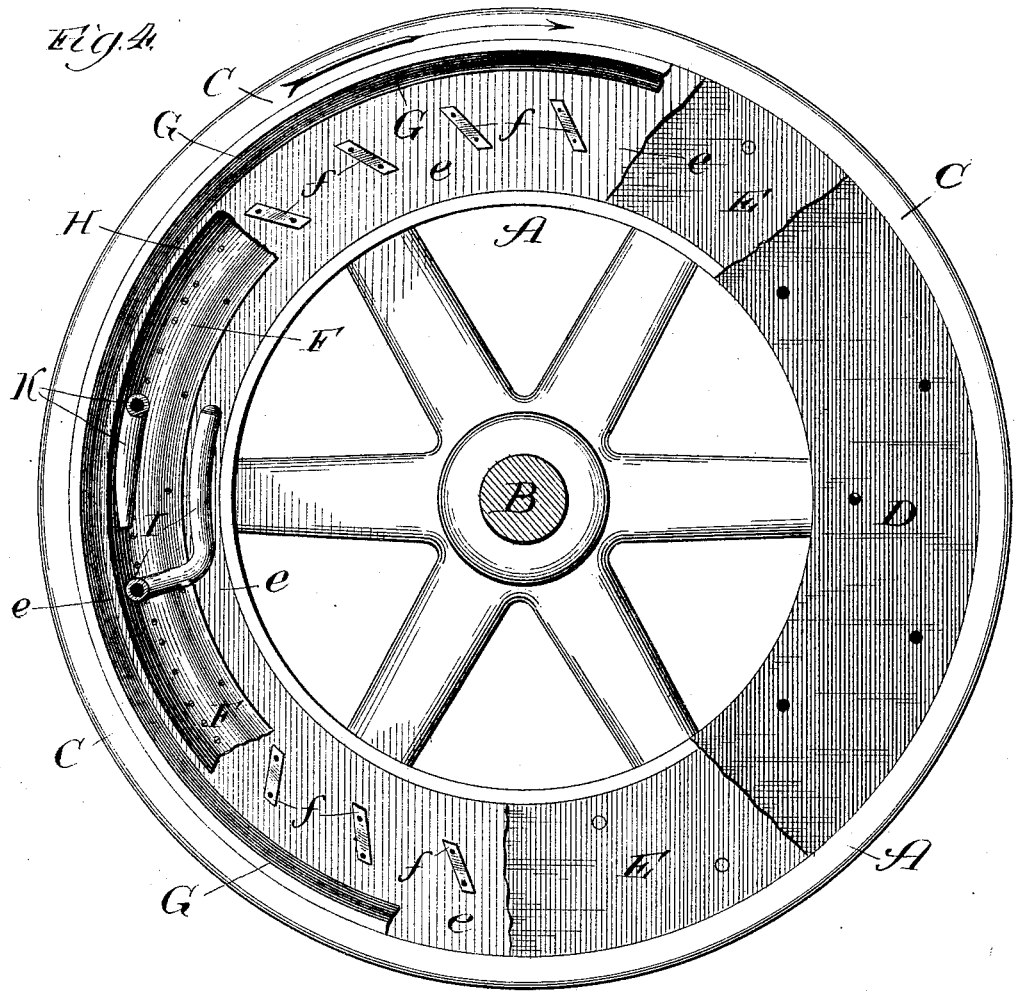
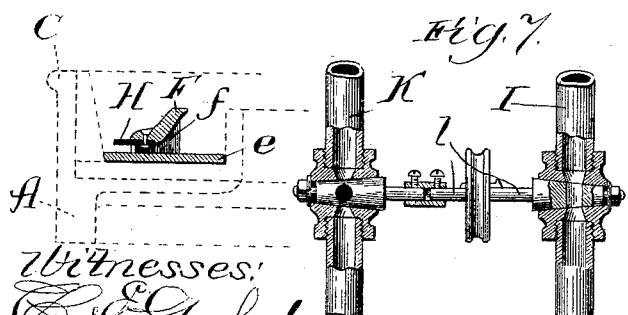
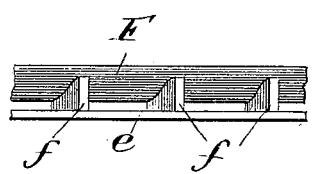
Witnesses:
Chas. E. Gaylord
Clifford W. White
Inventor:
Orrin B. Peck,
By Banning & Banning & Payson
Att'ys (No Model.) 5 Sheets—Sheet 4.

O. B. PECK.
CENTRIFUGAL ORE SEPARATOR.

No. 479,456. Patented July 26, 1892.

Witnesses:
Chas. E. Gaylord
Clifford H. White

Inventor:
Orrin B. Peck.
By Banning & Banning & Payson
Attys.

(No Model.) 5 Sheets—Sheet 5.
O. B. PECK.
CENTRIFUGAL ORE SEPARATOR.

No. 479,456. Patented July 26, 1892.

Witnesses:
Chas. E. Gaylord
Clifford W. White

Inventor:
Orrin B. Peck,
By Banning & Banning & Payson,
Attys.

THE NORRIS PETERS CO., PHOTO-LITHO., WASHINGTON, D. C.

UNITED STATES PATENT OFFICE.

ORRIN B. PECK, OF CHICAGO, ILLINOIS, ASSIGNOR TO MELINDA PECK, OF SAME PLACE.

CENTRIFUGAL ORE-SEPARATOR.

SPECIFICATION forming part of Letters Patent No. 479,456, dated July 26, 1892.

Application filed January 11, 1892. Serial No. 417,682. (No model.)

*To all whom it may concern:*

Be it known that I, ORRIN B. PECK, a citizen of the United States, residing at Chicago, Illinois, have invented certain new and useful Improvements in Centrifugal Ore-Separators, of which the following is a specification.

Figure 1:
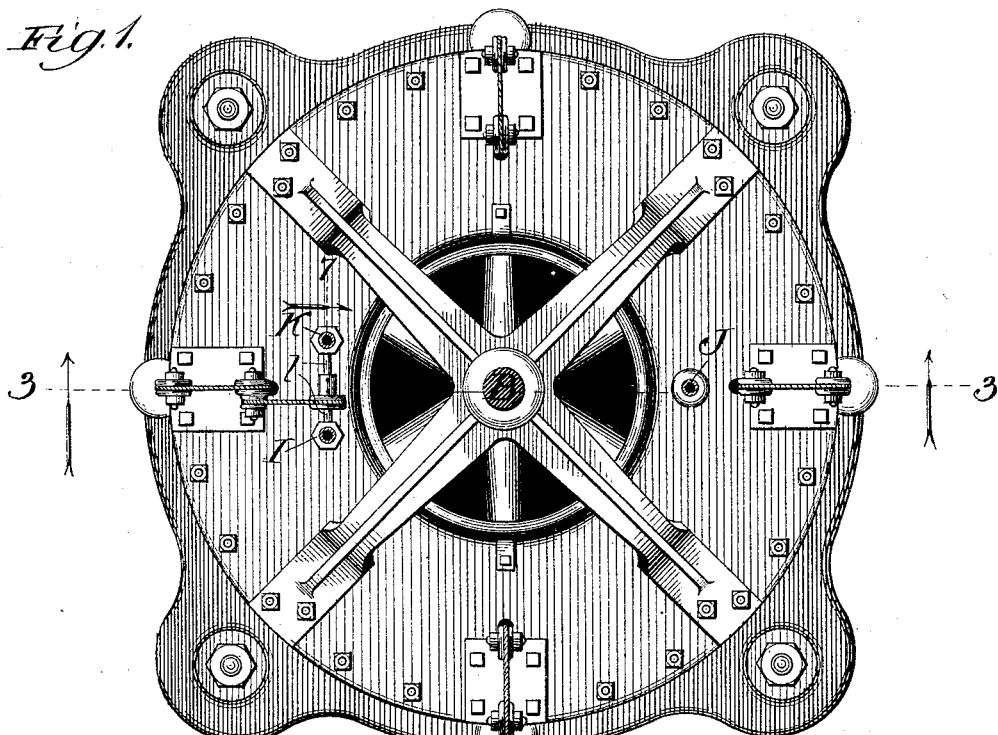
Figure 2:
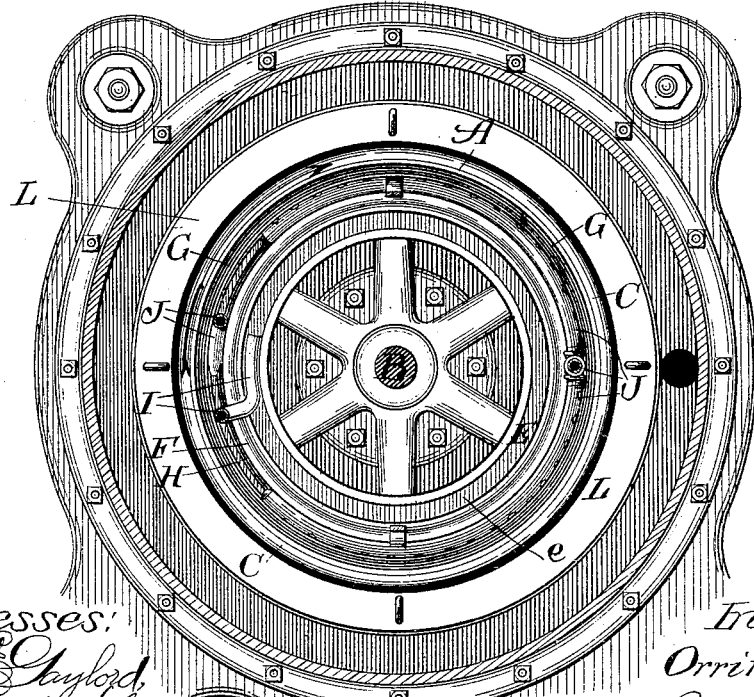
Figure 8:
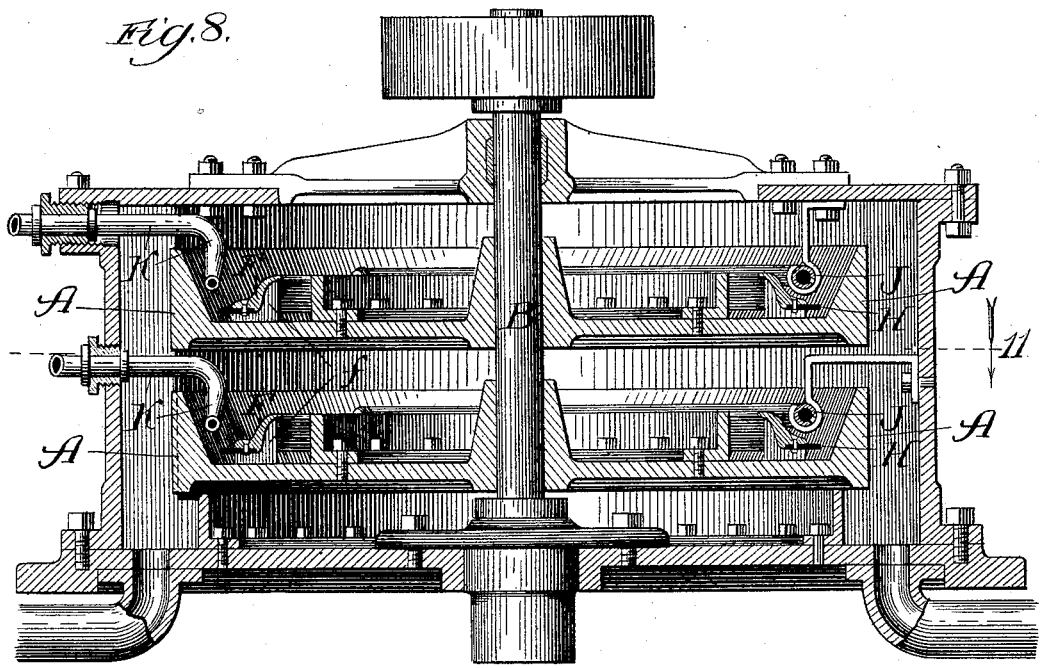
Figure 9:
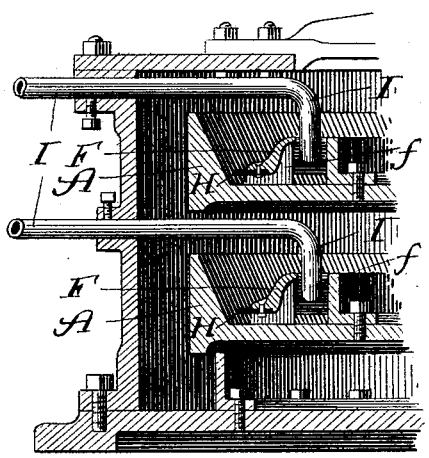
Figure 10:
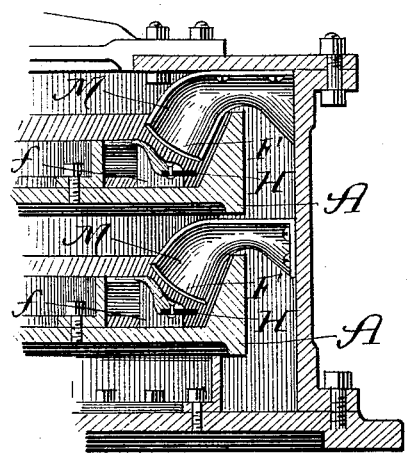
Figure 11:
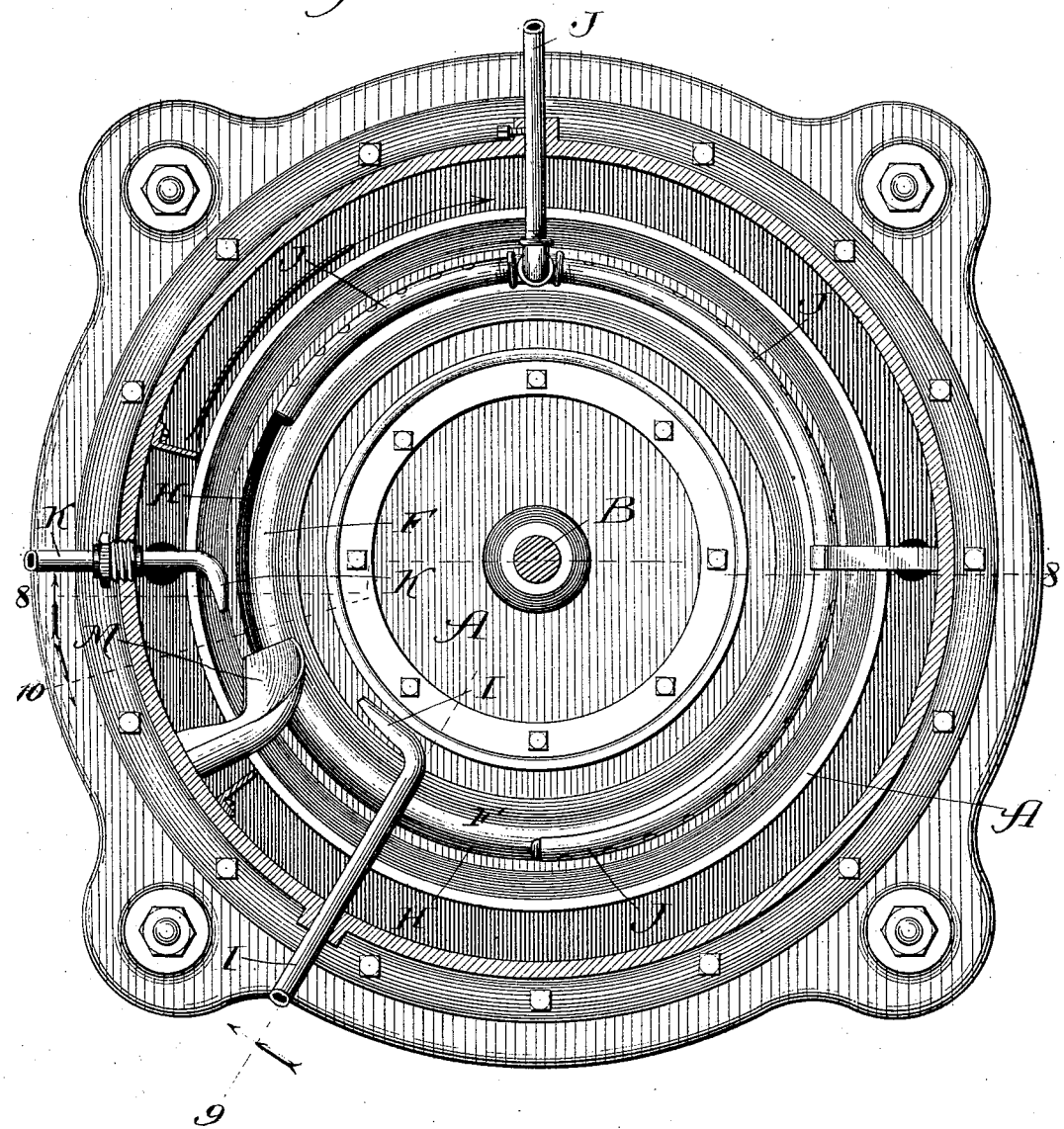

In the drawings, Figure 1 is a plan view of my improved apparatus. Fig. 2 is a section of the apparatus, taken in the line 2 of Fig. 3, looking in the direction of the arrow. Fig. 3 is a transverse vertical section taken through the line 3 of Fig. 1, looking in the direction of the arrow. Fig. 4 is a broken plan view of the separating-wheel. Figs. 5, 6, and 7 are details which will hereinafter be explained. Fig. 8 is a transverse vertical section of a modified form of apparatus, taken in the line 8 of Fig. 11. Figs. 9 and 10 are vertical sections of a portion of such modified apparatus, taken in the lines 9 and 10 of Fig. 11, looking in the direction of the arrows; and Fig. 11 is a plan view of a section of the apparatus, taken in the line 11 of Fig. 8, looking in the direction of the arrow.

In making my improved apparatus for separating powdered or finely-divided particles containing mineral-bearing substances of different degrees of specific gravity I make what I term a "separating-wheel" A, intended to be mounted upon and revolved by a shaft B, which may be rotated by a pulley engaged by a belt driven by any convenient motive power or in any other convenient way. I prefer to support the rotatable shaft B in suitable bearings and mount its lower end in a step, making a ball-bearing. As to these details much latitude may be indulged.

The separating-wheel A is preferably of large diameter and provided with spokes radiating from a central hub, as shown particularly in Fig. 4. It is preferably provided with a rim C, of some considerable vertical depth, with an inwardly-projecting flange D extending toward the hub a requisite distance to afford the necessary space to accommodate the matter intended to be treated or the parts on which the matter is directly or immediately deposited for treatment. As illustrated in the drawings, a flat ring E, angle-shaped around its inner edge, is arranged directly on the inwardly-projecting flange D of the separating-wheel, and on this is again placed a wearing-plate *e*, on which the material to be treated is deposited. It is obvious, however, that the inwardly-projecting flange D can be turned up at its inner edge and the material to be treated deposited directly upon it, thereby dispensing with the ring and wearing-plate. As shown in the drawings, I have arranged an inwardly-inclined deflecting-plate F, supported on lugs *f*, so as to be held above the surface of the wearing-plate. This deflecting-plate is intended to operate as a cover, guide, or guard to prevent the material being treated from spattering and insure its proper delivery to the edge of the separating-surface. The lugs also facilitate and assist the delivery of the material to the edge of the wheel, as they force it toward the edge in the shortest path, instead of allowing it to slip along over the surface of the wheel. Sufficient space is preserved between the abutment-flange of the ring E and the inwardly-projecting edge of the deflecting-plate F to form an annular channel and permit of the introduction of the material to be treated between them. On the inside of the rim C, above the ring E, I have arranged an outwardly-inclined separating-surface G, which gives an angle or slope, if desired, to the wall of the separating-wheel and affords a surface on which the material to be saved may accumulate until removed, as hereinafter explained. I also prefer to so locate the outer edge of the deflecting plate or guide F with reference to the surface ring G as to leave but a small annular space between them, and to still lessen their space by arranging a flexible ring H, made of rubber, leather, or other flexible material, below the deflecting or guide plate, so as to extend out toward the surface ring.

I introduce the material to be treated through a material-supply pipe I into the channel between the plate F and the vertical flange of the plate E, as particularly shown in Fig. 3. I introduce a water-supply pipe J, which is carried around on the inside of the separating-wheel and near the surface ring G a desired distance and provided with a number of holes or perforations through which the water may be gently sprayed against the surface of the ring G while the separation of the material subjected to treatment is being carried on. As shown in Fig. 2, the water-spraying pipe is carried around about three-fourths of the distance of the interior of the separating-wheel; but I do not desire to limit myself to this or any other particular proportion or extent to which the spraying-pipe shall be arranged. Preferably in that portion of the separating-wheel between the ends of the spraying-pipe the material-supply pipe I is arranged, and a little back of the end of such pipe, as shown in Fig. 2, is introduced a hydraulic pipe K, with its end preferably turned in a direction opposite to the course of rotation of the separating-wheel. This hydraulic pipe is intended to have proper connection with a force-pump or other suitable means for forcing one or more jets or streams of water with the desired force through it and against the separating surface ring G. As the material is introduced through the pipe I it falls on the wearing-plate and is immediately carried by the action of centrifugal force outward under the deflecting-plate F and up along the surface of the surface ring G, where it is subjected to the spraying action of the water flowing from the pipe J. While being carried around and subjected to this spraying of the water the lighter particles, through the combined action of the water and of the centrifugal force to which they are subjected, are separated from the heavier and more valuable particles and driven or carried up over the surface ring and discharged over the rim of the separating-wheel into a suitable curbing or other receptacle to receive them, while the heavier and more valuable particles adhere to the surface ring until they have been carried farther around, when they are subjected to the force of the jets or streams of water driven in through the hydraulic pipe K, which detaches them from the surface, so that they are thrown off by the combined action of the jets or streams of water and the centrifugal force. To effect this, the jets or streams of water forced in through the pipe K are driven with greater force or power than the streams which spray upon the material being treated through the pipe J.

The operation of the apparatus as thus far described has contemplated the continuous supplying of material to the separating-wheel and the continuous supplying of sprays of water through the pipe J and streams or jets of water through the hydraulic pipe K, so that the operation of supplying, separating, and removing the particles is a continuous and uninterrupted one. I contemplate, however, employing means of supplying, separating, and removing the particles of material intermittently as well as continuously. In the first three sheets of the drawings I have shown means for carrying on the operation intermittently, while in the last two sheets of the drawings I have shown the means that I propose to employ when the operation is carried on continuously.

I will first describe the apparatus as shown in the first three figures of the drawings, and then the modifications shown in the last two sheets. To prevent the heavier particles, which it is desired to save, from being forced over into the curbing or receptacle with the lighter particles, I have shown in the apparatus illustrated in the first three sheets of the drawings an adjustable partition L, surrounding the revoluble separating-wheel, and means for periodically raising and lowering this partition, so that the particles passing over the rim of the separating-wheel will be caught within the partition or carried beyond it, as it may be, up or down. The means shown for adjusting the position of the partition consist of weights and pulleys, and I have so connected the pipes K and I with a shaft $l$, carrying a pulley, by which the shaft may be rotated in one direction or the other to close the pipe I while the pipe K is being opened or to open the pipe I while the pipe K is being closed, so as to shut off the supply of material when the jets or streams of water are being introduced. The arrangement of the shaft $l$ and the valves are illustrated in Fig. 7; but any other sufficient means may be employed for closing the material-pipe when the hydraulic pipe is being opened. If preferred, however, the material-supply pipe I, supplying material, and the water-supply pipe J, supplying water to assist in removing the lighter particles, and the hydraulic pipe K, supplying jets or streams of water to assist in removing the heavier particles, may constantly remain open, and means for saving the heavier and more valuable particles thus constantly washed and thrown off may be used, so that the operation of separating the lighter particles and saving the heavier particles may be carried on continuously and simultaneously. I have shown means for catching and securing the heavier particles and preserving a continuous and uninterrupted operation in the modified form of apparatus shown in the last two sheets of the drawings, which I will now describe.

In the modified form of apparatus I have shown two separating-wheels and the material-supply pipes, water-spraying pipes, and hydraulic pipes entering from the sides. Of course it is obvious that these pipes may be introduced from the sides when but a single wheel is used, if desired. To catch and secure the heavier particles of the material being treated, I employ deflecting plates or scoops M, supported in any suitable manner in a fixed position, so as to present their mouths in the separating-wheel at a position sufficiently near to the mouth of the hydraulic pipe and facing it. These scoops are adapted to receive the material thrown upon them by the forcible jets or streams of water washing the heavier particles from the surface ring of the separating-wheel and to either deliver such particles outside of the wheel or hold them until it is desired to remove them.

Many modifications of the mechanical means shown and described may be employed, and I do not, therefore, desire to limit myself to the details of construction of the mechanism shown and described.

I have described and claimed the process to carry out which the mechanism above described may be applied in another application filed contemporaneously with this and serially numbered 417,681, and I therefore desire in this case to simply claim the novel features of construction described and shown.

What I regard as new, and desire to secure in this application, is—

1. In centrifugal ore-separators, the combination of a rotatable separating-surface adapted to receive the material to be treated, means for forcing jets or streams of water under pressure for removing the material treated from the action of centrifugal force at desired times, and means for rotating the separating surface, substantially as described.

2. In centrifugal ore-separators, the combination of a rotatable separating-wheel, means for depositing the material to be treated on the separating-surface of such wheel, means for forcing jets or streams of water under pressure for removing the material treated from the action of centrifugal force at desired times, and means for rotating the separating-wheel, substantially as described.

3. In centrifugal ore-separators, the combination of a rotatable separating-wheel, means for depositing the material to be treated on the separating-surface of such wheel at desired intervals, means for supplying water upon the material while under treatment for assisting in the discharge of the lighter particles, means for forcing jets or streams of water under pressure on the material after it has been sprayed to assist in discharging the heavier particles, and means for rotating the separating-wheel, substantially as described.

4. In centrifugal ore-separators, the combination of a rotatable separating-wheel, means for depositing the material to be treated on the separating-surface of such wheel, a water-supply pipe spraying water on the separating-surface of the wheel to assist in the separation of the lighter particles and a hydraulic pipe forcing streams or jets of water against the separating-surface of the wheel to remove the heavier particles, means for catching and securing such particles, and means for rotating the separating-wheel, substantially as described.

ORRIN B. PECK.

Witnesses:
   THOMAS A. BANNING,
   MARIE L. PRICE.